United States Patent [19]

Yeung

[11] Patent Number: 5,542,531
[45] Date of Patent: Aug. 6, 1996

[54] HOLDER FOR COMPACT DISC HAVING CARRIER PART

[75] Inventor: Choi K. Yeung, Hong Kong, Hong Kong

[73] Assignee: Encore Holdings Limited, Nassau, Bahamas

[21] Appl. No.: 169,720

[22] Filed: Dec. 17, 1993

Related U.S. Application Data

[63] Continuation of Ser. No. 936,227, Aug. 26, 1992, abandoned.

[30] Foreign Application Priority Data

Nov. 12, 1991 [GB] United Kingdom .................. 9123974

[51] Int. Cl.⁶ ................................................. B65D 85/57
[52] U.S. Cl. ....................................... 206/308.1; 206/312
[58] Field of Search .................................. 206/309–313, 206/444, 308.1

[56] References Cited

U.S. PATENT DOCUMENTS 4,535,888  8/1985  Nusselder ............................. 206/444
4,778,047  10/1988  Lay ............................... 206/308.1 X
4,793,480  12/1988  Gelardi et al. ......................... 206/312
4,844,260  7/1989  Jaw .................................. 206/311 X
5,284,248  2/1994  Dunker .................................. 206/444

FOREIGN PATENT DOCUMENTS 0420350  4/1991  European Pat. Off. ............... 206/310

*Primary Examiner*—Bryon P. Gehman
*Attorney, Agent, or Firm*—Birch, Stewart, Kolasch & Birch, LLP

[57] ABSTRACT

A case for holding two compact discs or the like includes a front cover part (12), a rear cover part (14) and a carrier part (18). The front and rear cover parts are pivotally coupled along one wall of the case, and the carrier part is pivotally mounted between the cover parts near or at the above one edge of the case. The case when closed has approximately the same thickness as a standard single CD case. The carrier part has retaining tabs (44a, 44b) for retaining a compact disc adjacent each of two opposite faces (38, 40) of the carrier part. The front and rear cover parts may comprise the front and rear parts of a standard single CD case, with the conventional fixed CD carrying part omitted.

12 Claims, 2 Drawing Sheets

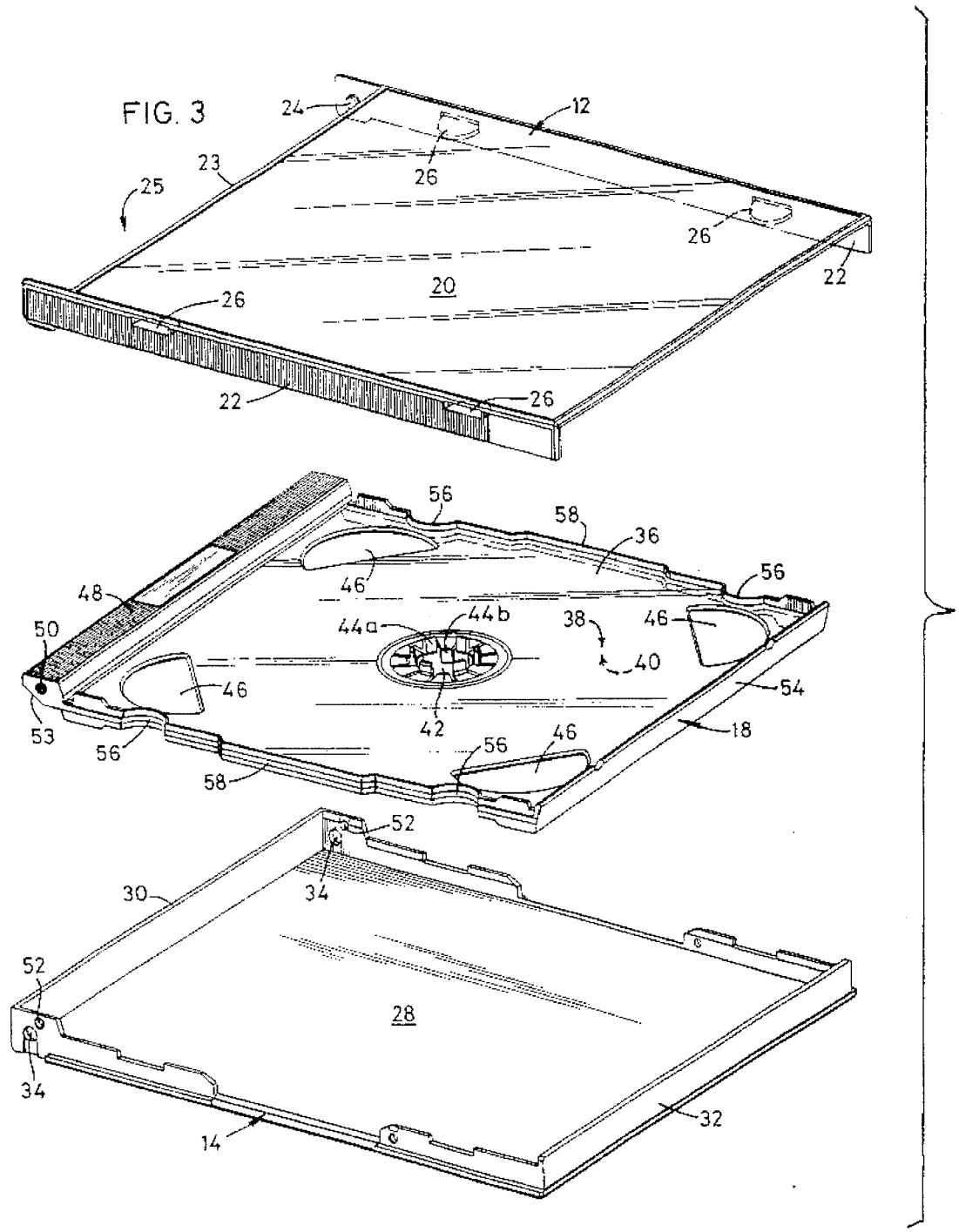

HOLDER FOR COMPACT DISC HAVING CARRIER PART

This is a continuation of application Ser. No. 07/936,227 filed on Aug. 26, 1992, now abandoned.

BACKGROUND OF THE INVENTION

1. Field of the Invention

This invention relates to a case for holding two compact discs, or the like. The term compact disc (CD) as used herein refers to digitally encoded optical discs, particularly but not exclusively video, audio or CD-ROM discs. Such discs are made in several diameter sizes, the most common of which is 12 cm.

2. Description of Background Art

An industrial standard has already been established for the dimensions and configurations of CDs, cases for holding single CDs and cases for holding double CDs. In general all CD manufacturers produce CD cases within the parameters of the industrial standard so that their products can be used for holding standard size CDs, be easily displayed on display shelves in shops, and can accommodate the insertion of printed inserts of standard formats. This also allows end customers to conveniently store the cases with other CDs in their collections.

A conventional double CD case has the same dimensions as those of a single CD case except that its depth or thickness is slightly more than double that of the single CD case. The standard thickness of a single CD case is about 10 mm (as measured from front to rear when the case is closed), whereas the standard thickness of a double CD case is about 24 mm. For the manufacturer, the larger size means increased manufacturing and transportation costs, and for the consumer the larger size means that more storage space is required. Furthermore, conventional storage racks for storing single CDs are not suitably adapted for holding double CD cases to allow a mixture of single and double CD cases to be stored in the same rack.

Double CD cases which have the same external dimensions as a standard single CD case are known in the art, but these designs suffer from other drawbacks.

For example, EP-A-0420350 describes a case which has a front or top lid swivellably attached to one edge of an intermediate part, and a rear or bottom lid swivellably attached to another edge of the intermediate part at the opposite end of the intermediate part to the first edge. When the lids are both opened, the case forms a zig-zag shape. However, such a case requires a special type of printed insert to be used because the standard format for printed inserts for a conventional single CD case will not fit. The conventional insert format comprises a fairly elaborate front-cover leaflet with several pages describing the contents and the performers, to be inserted on the inside of the top lid, and a single back-cover sheet of simple description inserted on the inside of the bottom lid. The design and printing of the alternative inserts and the machinery needed to fit the new inserts adds to the costs of manufacture.

Furthermore, in order to achieve the same overall dimensions as a conventional single CD case, the top and bottom lids tend to be thinner and therefore less solid than the conventional single CD case. A further drawback is that since the top and bottom lids are placed in juxta positions, it is necessary to turnover the whole CD case to get the second CD after taking/replacing the first CD.

An alternative design of a relatively thin double CD case is also known in which a tray for carrying the two CDs is hinged to the bottom lid of the case at the opposite end of the case to the hinge connection between the top and bottom lids. With this design, the tray opens outwardly away from the top and bottom lids to give the user access to the CD carried on the underside of the tray. The major problem with this is that when the tray is opened it travels outside the top and bottom lids, and the CD which originally rests on the upper surface of the tray will be suspended upside down outside the case. If the CD is not clamped properly to the tray, it may well drop off and be damaged since it will not be protected by either of the lids.

Furthermore, the arrangement of the discs may be confusing to the user since, when the case is fully opened, the disc originally resting on top of the tray will become the disc underneath the tray, and vica versa.

SUMMARY AND OBJECTS OF THE INVENTION

The present invention has been devised with the aim of overcoming these problems.

According to the present invention there is provided a case for holding two compact discs or the like, the case comprising a front cover part, a rear cover part, a carrier part having retaining means for retaining two discs one adjacent to each of two opposite faces of the carrier part, and pivotal coupling means for pivotally coupling together the front and rear cover parts along one edge of the case and for pivotally mounting the carrier part between the cover parts near or at the aforementioned one edge of the case, the case when closed having approximately the same thickness as a standard case for holding a single compact disc.

With such an arrangement, the front and rear cover parts, and the carrier part, are pivotally coupled near or along one edge of the case.

Preferably, the pivotal coupling means comprises first pivot means for coupling the front and rear cover parts along the aforementioned one edge of the case, and second pivot means for coupling the carrier part to one of the cover parts, the pivot axis of the second pivot means being at a position near and substantially parallel with the aforementioned one edge of the case.

Preferably, the front and rear cover parts are shaped such that, when the case is closed, the front and rear cover parts together substantially completely enclose the edges of the carrier part.

Preferably, the lateral dimensions of the carrier part are smaller than the corresponding lateral dimensions of the front and rear cover parts such that, when the case is closed, the edges of the cover parts extend beyond the edges of the carrier part.

As exemplified by the following description of a preferred embodiment, the front cover part, the rear cover part and the first pivot means may comprise the pivotally coupled front and rear parts of a standard CD case for a single compact disc with the conventional fixed disc carrying part omitted.

BRIEF DESCRIPTION OF THE INVENTION

An embodiment of the invention will now be described by way of example with reference to the accompanying drawings, in which:

FIG. 3 is an exploded view showing the separate parts of the case.

DETAILED DESCRIPTION OF THE PREFERRED EMBODIMENT

Figure 2:
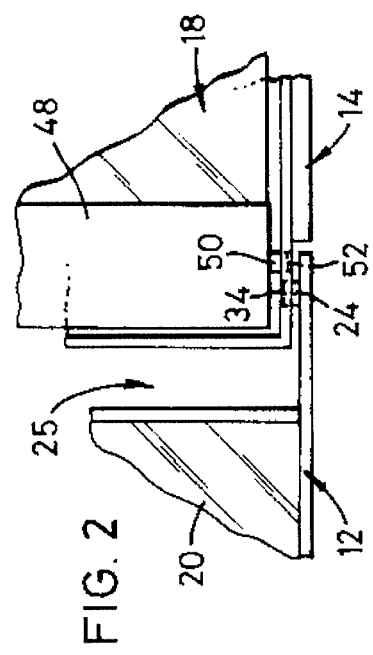
FIG. 2 is a diagrammatic view from above showing hinge detail of the CD case when open, on an enlarged scale.
Figure 1:
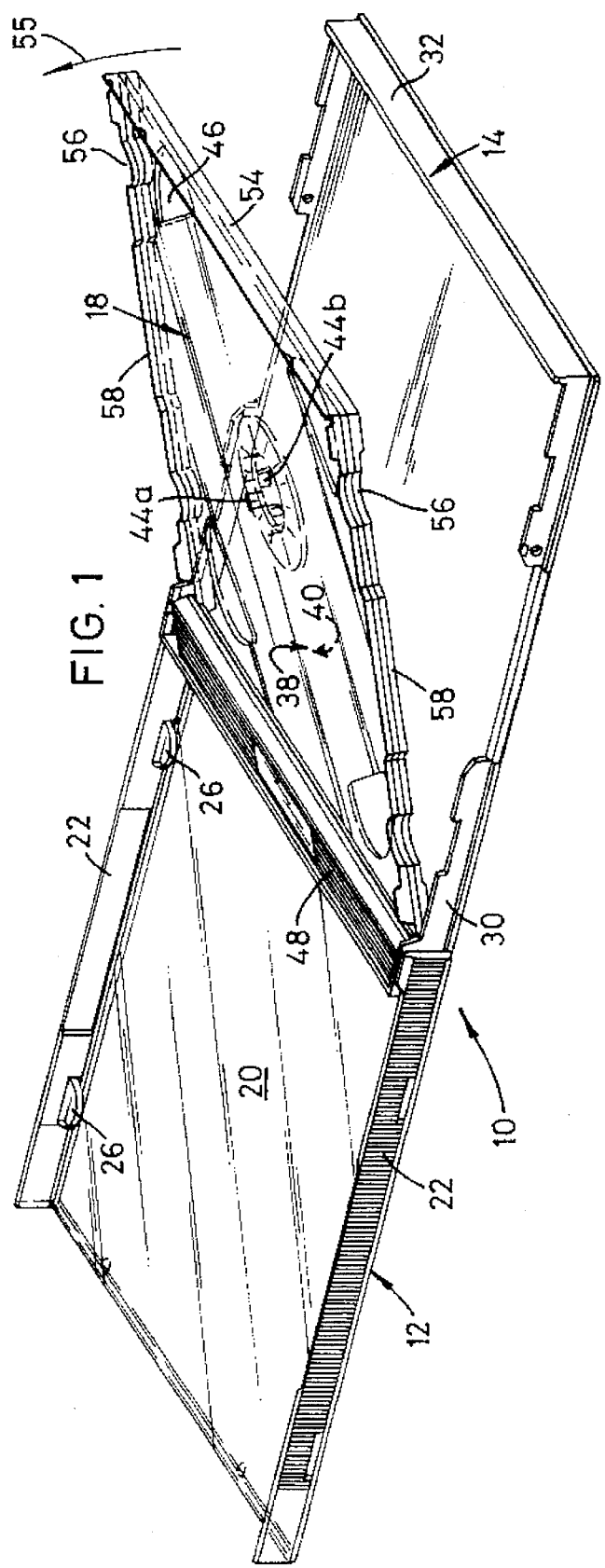
FIG. 1 is a perspective view of a double CD case in the open position.

Referring to the drawings, a case 10 for holding two compact discs (not shown) comprises a front cover part 12, a rear cover part 14 and a tray or carrier part 18. The cover parts 12 and 14 are made preferably of transparent plastics material, but they may alternatively be made of opaque material. The carrier part 18 may be made of transparent or opaque plastics material.

The front cover part 12 is substantially identical to a front part of a standard case for holding a single CD. It comprises a substantially square shaped planar portion 20 and two side walls 22 which extend towards the rear cover part 14 when the case is closed (see FIG. 3). The side walls 22 project beyond one edge 23 of the planar portion 20 to define a C-shaped opening 25 at the edge 23. Two first pivot projections 24 are formed on the walls 22, facing inwardly towards one another on the opposite sides of the C-shaped opening 25. Two inwardly extending locating tabs 26 are also formed on each wall 22 at locations under the planar portion 20. The tabs 26 are intended for retaining a first printed insert (not shown) adjacent the inside face of the front cover part 12. The printed insert may be of the standard pamphlet design used for the front covers of standard single CD cases.

The rear cover part 14 is substantially identical to a rear part of a standard case for holding a single CD. It comprises a substantially planar portion 28 with two C-shaped end walls 30 and 32.

The two C-shaped walls 30 and 32 are arranged such that when the case is closed, the end walls 30 and 32 fit between the side walls 22 of the front cover part 12 to form the four edge walls of the case which substantially completely enclose the edges of the carrier part 18. The side wall 30 adjacent the C-shaped opening 25 is formed with a pair of first pivot openings 34 for receiving the first pivot projections 24, to thereby form a first pivot or hinge connection between the front cover part 12 and the rear cover part 14 along one edge of the case.

The rear-cover part 14 is intended to receive a second printed insert (not shown) placed adjacent the inside face of the planar portion 28. The printed insert may be of the standard single sheet design used for the rear covers of standard CD cases.

The carrier part 18 comprises a substantially planar portion 36 having a front face 38 and a rear face 40. A circular opening 42 is formed near the centre of the planar portion 36, and twelve radially inwardly extending disc retaining tabs 44a and 44b are formed around periphery of the opening 42. Each tab 44 is L-shaped, and six of the tabs 44a are arranged with their ends projecting on the front face 38 of the carrier and the other six tabs 44b are arranged with their ends projecting on the rear face 38 of the carrier, the two sets of tabs 44a and 44b being arranged alternately around the periphery. The end of the tabs 44 are arranged on a pitch circle diameter of about 10 mm which is the same as the diameter of the hole in the centre of a CD. The set of tabs 44a form retaining means to enable one CD to be retained against the front face 38 of the carrier part 18, and the set of tabs 44b form retaining means to enable a second CD to be retained against the rear face 40 of the carrier part 18. The tabs 44 are resilient to enable the CDs to be clipped-on, or pulled-off, in the usual way.

A roughly semi-circular finger cut-out 46 is formed near each of the four corners of the planar portion. These serve as finger holes to provide room for a user to place his or her fingers around the edge of a CD to remove a CD from the retaining tabs 44.

The edge of the carrier part 18 adjacent the C-shaped opening 25 of the front cover part 12 is formed as a raised-up step portion 48, and two outwardly facing second pivot projections 50 are formed at the opposite ends of the step portion 48. The carrier part 18 is dimensioned to fit between the C-shaped walls 30 and 32 of the rear carrier part 14. Two second pivot openings are formed in the C-shaped wall 30, adjacent the first pivot openings 34, to receive the second pivot projections 50 of the carrier part and thereby form a second pivot or hinge connection between the rear cover part 14 and the carrier part 18.

As shown in FIG. 2, the second pivot openings 52 are spaced by a small distance from the first pivot openings 34. The carrier part 18 is coupled to the rear cover part 14 to pivot about a pivot axis which is near and substantially parallel with the pivot axis of the pivotal coupling between the front cover part 12 and the rear cover part 14 along the edge of the case. The carrier part 18 is thus pivotally mounted between the cover parts near the edge of the case.

The lower corner region 53 of the step portion 48 is chamfered to leave a clearance between the corner region 53 and the rear cover part 14, so that the carrier part 18 can be freely moved in the direction of arrow 55 when the case 10 is open. This enables the carrier part 18 to be moved over to lie against the front cover part 12 to access the disc retained adjacent the rear face 40 of the carrier part.

A rim 54 is formed around the edge of the carrier part 18, and projects a short distance from of the front face 38 and of the rear face 40, to protect the CDs from being squashed by the cover parts 12 and 14 when the case 10 is closed. The edge of the carrier part 18 is also shaped with four semi-circular recesses 56 to allow room for the tabs 26 of the upper part 12 when the case is closed, and two bulges 58 which locate in the gaps between the ends of the C-shaped walls 30 and 32 of the rear cover part 14 when the case is closed.

It will be appreciated that with this embodiment, a double CD case can be assembled which uses the front and rear cover parts of a standard single CD case with very little modification being required. Essentially, the usual fixed retaining tray for the single CD is omitted, and replaced by the carrier part 18 which is pivotally coupled to the rear cover part adjacent the conventional pivotal connection between the front and rear cover parts. The use of two pivot (hinge) couplings means that no modification of the conventional pivotal connection between the front and rear cover parts is required. As best seen in FIG. 3, the opening 52 for the second pivotal coupling is made smaller than the original opening 34 for the first pivotal coupling so as not to reduce the amount of plastics material in the corner region, which might otherwise reduce the strength of the case.

It will also be appreciated that with this embodiment, the lateral dimensions of the carrier part 18 are such that when the case is closed, the edges of the front and rear cover parts extend beyond the edges of the carrier part 18. The side and end walls of the front and rear cover parts also substantially enclose the edges of the carrier part 18. The carrier part 18 is thereby protected by the cover parts from direct impacts against the edges of the case.

It will further be appreciated that this embodiment provides a double CD case which is roughly the same size as a standard single CD case, and which does not suffer substantially from the problems of the prior art discussed above.

Firstly, the design of the case enables the standard format of printed inserts for a single CD case to be used. Therefore, there is no need to design and print new inserts, and the conventional manufacturing machinery can be used to fit the inserts into the case.

Secondly, the thickness of the plastics material from which the front and rear cover parts are made does not have to be reduced compared to the thickness of the covers of a standard CD case.

Thirdly, when the case is opened out, the CD which is not displayed is substantially protected by one of the covers. For example, when the front cover is opened to reveal the first CD retained on the front face of the carrier part, the second CD although suspended upside down is protected by the rear cover part in case the second CD becomes detached. Similarly, when the carrier part is moved over against the front cover part to reveal the second CD, the first CD although suspended upside down is protected by the front cover part in case the first CD becomes detached.

Furthermore, it is not necessary to turn the whole case upside down to access the second CD. With the above embodiment, it is merely necessary to turn the carrier part over against the front cover portion to reveal the second CD, or to reveal the retaining tabs to secure the second CD in place.

Although the embodiment described above incorporates two pivotal connections for joining the front, rear and carrier parts of the case, in an alternative embodiment only a single pivotal connection might be used. For example, the front rear and carrier parts would be pivoted together along one edge of the case, on a common pivot axis. However, such a design would not enable the case to use the standard front and rear covers of a single CD case, because the standard pivotal connection would need to be changed.

I claim:

1. A case for holding two compact discs, the case comprising:

a front cover part having side walls extending therefrom, a rear cover part having side walls extending therefrom, a carrier part having opposite faces each having retaining means for retaining a disc, a first pivot including a projection and an opening formed in one of said side walls of said front cover part and said rear cover part for pivotally coupling together the front and rear cover parts along one edge of the case for pivotal movement between an open and closed position, and a second pivot including a projection and an opening formed in one of said carrier part and said side wall of said rear cover part, said second pivot being disposed adjacent to and offset relative to the first pivot for mounting the carrier part between the cover parts at the said one edge of the case for pivotal movement between the front and rear cover parts and independent of the pivotal movement of the front and rear cover parts to present the carrier part opposite faces, said case when closed having approximately the same thickness as a case for holding a single compact disc.

2. A case according to claim 1, wherein the second pivot has an axis being at a position near and substantially parallel with the said one edge of the case.

3. A case according to claim 1 or 2, wherein the front and rear cover parts are shaped such that, when the case is closed, the front cover part and rear cover part together envelop the carrier part.

4. A case according to claim 1, wherein the lateral dimensions of the carrier part are smaller than the corresponding lateral dimensions of the front and rear cover parts such that, when the case is closed, the edges of the cover parts extend beyond the edges of the carrier part.

5. A case for holding no more than two compact discs, the case having a thickness substantially that of a case for holding a single disc, the case comprising:

a front substantially planar cover part having side walls extending therefrom, a rear substantially planar cover part having side walls extending therefrom, a carrier part having means for retaining discs and having a substantially planar portion with a front face and a rear face, a first disc retained to abut the front face and a second disc retained to abut the rear face, said discs retained in relative back to back relationship with the planar portion between the discs, and a first pivot including a projection and an opening formed in one of said side walls of said front cover part and said rear cover part for pivotally coupling together the front and rear cover parts along one edge of the case, and a second pivot including a projection and an opening formed in one of said carrier part and said side wall of said rear cover part, said second pivot being disposed adjacent to and offset relative to the first pivot for mounting the carrier part independently between the cover parts at the one edge of the case for pivotal movement between the front and rear cover parts to provide access to each of the carrier front and rear faces, the front and rear cover parts together substantially completely enclose the carrier part so that the carrier part is internally contained within the closed cover parts and is substantially centrally located between the front and rear parts and wherein when the front part and rear part are closed, the case has approximately the same thickness as a case for holding a single compact disc.

6. A case as claimed in claim 5, wherein the first pivot is equally spaced between the front cover part and rear cover part in the thickness dimension and the second pivot is spaced from the first pivot in a direction transverse to the said one edge.

7. A case as claimed in claim 6, wherein the second pivot is disposed on the rear cover part.

8. A case for holding up to two compact discs comprising:

a front cover part having side walls extending therefrom;

a rear cover part having side walls extending therefrom;

a carrier having opposite faces each having means for retaining a disc;

a first pivot including a projection and an opening formed in one of said side walls of said front cover part and said rear cover part for pivotally coupling together the front and rear cover parts along one edge for movement between a closed position, defining a closed case for holding up to two discs, and an open position; and a second pivot including protection and an opening formed in one of said carrier part and said side wall of said rear cover part, said second pivot being disposed adjacent to and offset relative to said first pivot for pivotally mounting the carrier proximate said one edge and between said front and rear cover parts for pivotal motion independent of and between the front and rear cover parts to provide access to said carrier opposite faces, said front and rear cover part when closed containing the carrier therebetween.

9. The case of claim 8, wherein the second pivot is disposed adjacent to the first pivot in a direction transverse from said edge.

10. The case of claim 9 wherein the case in a closed position defines a vertical dimension for the case, said second pivot spaced vertically from said first pivot.

11. A case for holding up to two compact discs comprising:

a front cover part having side walls extending therefrom;

a rear cover part having side walls extending therefrom;

a first pivot including a projection and an opening formed in one of said side walls of said front cover part and said rear cover part, said first pivot coupling the front cover part to the rear cover part along one edge for pivotal movement between a closed position, defining a closed case for holding up to two compact discs, and an open position;

a carrier having opposite faces each having a retainer for retaining a disc, the carrier contained between the front and rear cover parts when in the closed position; and a second pivot including a projection and an opening formed in one of said carrier part and said side wall of said rear cover part, said second pivot being disposed adjacent to and offset relative to said first pivot for pivotally mounting the carrier at the one edge for pivotal movement between the front and rear cover parts and independent of the pivotal movement of the front and rear cover parts when in the open position to present a selected retainer face for removal or replacement of a disc.

12. A case for holding two compact discs, the case comprising:

a front cover part having side walls extending therefrom;

a rear cover part having side walls extending therefrom;

a carrier part having opposite faces each having retaining means for retaining a disc;

a first pivot including a projection and an opening formed in one of said side walls of said front cover part and said rear cover part for pivotally coupling together the front and rear cover parts along one edge of the case for pivotal movement between an open and closed position; and a second pivot including a projection and an opening formed in one of said carrier part and said side wall of said rear cover part, said second pivot being disposed adjacent to and offset relative to the first pivot for mounting the carrier part between the cover parts at the said one edge of the case for pivotal movement between the front and rear cover parts and independent of the pivotal movement of the front and rear cover parts to present the carrier part opposite faces;

said carrier having a step portion formed on an end having said second pivot, said step portion being of a predetermined dimension for being received within a thickness of said side wall of said rear cover part when said carrier is pivoted relative thereto;

said case when closed having approximately the same thickness as a case for holding a single compact disc.

* * * * *